United States Patent [19]
Reiland et al.

[11] Patent Number: 5,823,548
[45] Date of Patent: Oct. 20, 1998

[54] CHILD CARRIER ACCESSORY ATTACHABLE TO A SHOPPING OR LUGGAGE CART

[75] Inventors: Mary J. Reiland, Apple Valley; Kenneth H. Reiland, Burnsville, both of Minn.

[73] Assignee: Four D. Inc., Burnsville, Minn.

[21] Appl. No.: 732,963

[22] Filed: Oct. 30, 1996

Related U.S. Application Data

[63] Continuation of Ser. No. 250,550, May 27, 1994, abandoned.

[51] Int. Cl.⁶ .............................. B62D 39/00; B62B 3/02
[52] U.S. Cl. ............................... 280/33.993; 280/33.997; 280/47.35; 280/47.4; 280/79.2
[58] Field of Search ................. D34/21, 27; 280/33.992, 280/33.993, 33.997, 47.35, 47.38, 47.4, 79.2, 204; 297/248, 256.17

[56] References Cited

U.S. PATENT DOCUMENTS

| | | |
|---|---|---|
| D. 281,365 | 11/1985 | Gugler . |
| D. 318,550 | 7/1991 | Stefano ..................................... D34/21 |
| D. 330,103 | 10/1992 | Andrews, Jr. et al. . |
| D. 357,105 | 4/1995 | Reiland et al. ........................... D34/27 |
| 2,420,088 | 5/1947 | Milburn .............................. 297/248 X |
| 2,997,311 | 8/1961 | Umanoff ............................. 280/33.993 |
| 3,044,801 | 7/1962 | Vicany . |
| 3,497,234 | 2/1970 | Schray . |
| 3,575,250 | 4/1971 | Dykes . |
| 3,834,726 | 9/1974 | Hobza . |
| 3,953,046 | 4/1976 | Johansson . |
| 4,610,454 | 9/1986 | Gill . |
| 4,650,199 | 3/1987 | Rehrig ................................. 280/33.997 |
| 4,771,840 | 9/1988 | Keller . |
| 5,011,169 | 4/1991 | Henderson et al. . |
| 5,076,599 | 12/1991 | Lockett et al. . |
| 5,149,114 | 9/1992 | Lewandowski et al. ...... 280/33.997 X |
| 5,176,395 | 1/1993 | Garforth-Bles . |
| 5,188,389 | 2/1993 | Baechler et al. . |
| 5,203,578 | 4/1993 | Davidson et al. . |
| 5,263,726 | 11/1993 | Wood ................................. 280/33.993 |
| 5,312,122 | 5/1994 | Doty ............................... 280/33.993 X |
| 5,641,200 | 6/1997 | Howell ............................... 297/256.17 |

FOREIGN PATENT DOCUMENTS

| | | | |
|---|---|---|---|
| 4202428 | 8/1992 | Germany | .......................... 280/33.992 |
| 4219121 | 12/1993 | Germany | ............................... 280/204 |
| 4317228 | 12/1993 | Germany | .......................... 280/33.993 |

OTHER PUBLICATIONS

Consumer Product Safety Alert. From the U.S. Consumer Product Safety Commission Washington, D.C. 20202. Mar. 1990. Falls from Shopping Carts Cause Head Injuries.
"mart cart 1", *Shopper's Aid, Marketed by Mart Cart*, Brochure.

*Primary Examiner*—Brian L. Johnson
*Assistant Examiner*—Bridget Avery
*Attorney, Agent, or Firm*—Faegree & Benson LLP

[57] ABSTRACT

A child carrier accessory attachable to a shopping or luggage cart which does not significantly reduce the functionality of the cart.

20 Claims, 8 Drawing Sheets

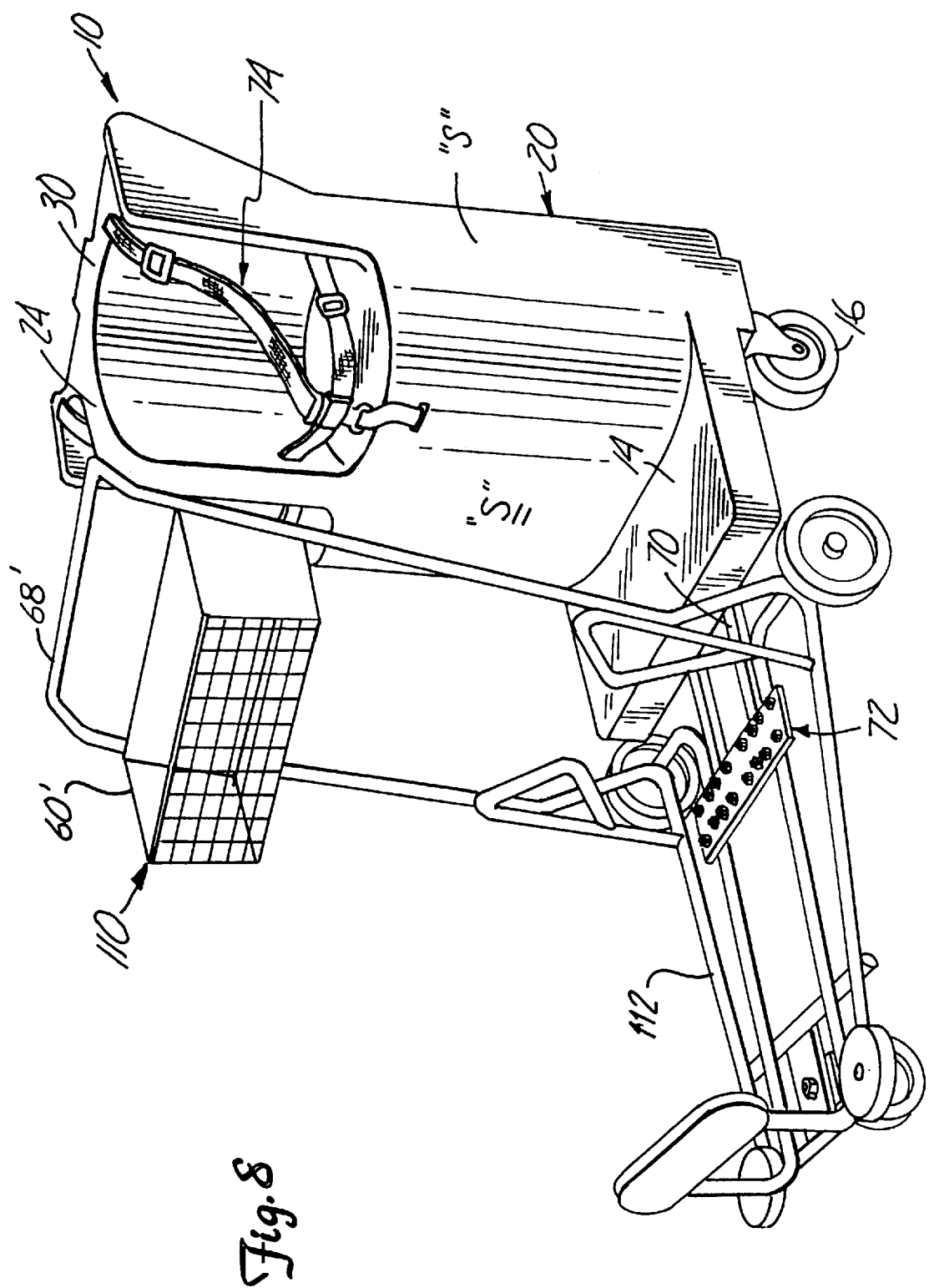

CHILD CARRIER ACCESSORY ATTACHABLE TO A SHOPPING OR LUGGAGE CART

This is a continuation of application Ser. No. 08/250,550, filed May 27, 1994 now abandoned.

FIELD OF THE INVENTION

The present invention relates to child carriers attachable to a cart, and in particular, to a child carrier accessory attachable to an ordinary shopping or luggage cart which does not significantly reduce the functionality of the cart.

BACKGROUND OF THE INVENTION

Shopping carts found in retail establishments generally include a child seat that is part of the rear panel of the shopping cart basket. A back support panel is attached to the rear panel, usually on the inside of the basket, thereby reducing the carrying capacity of the shopping cart. A fold down seat portion traverses the back support panel and the rear panel to form the child set proximate the upper portion of the rear panel. Generally, the child seat is arranged so that the child's legs extend through openings in the back panel. Airport luggage carts have a similar child seat arrangement. However, luggage carts weigh less than a shopping cart and are therefore more prone to tip over.

The child seats on shopping or luggage carts only have room for one child. Also, once a child reaches approximately 35 pounds, or is more than approximately 54" tall, the child seat on these carts starts to be too small and uncomfortable for the child. Additionally, children older than approximately 3 years find these seats confining and often attempt to climb out. Consequently, it is very common to see children riding in the basket portion of the shopping cart or standing on the front edge of the lower frame while gripping onto the basket portion, or standing on the luggage portion of a luggage cart.

Allowing a child to ride in the basket portion of the shopping cart has proven to be extremely dangerous. The U.S. Consumer Product Safety Commission reported 12,000 hospital emergency room head injuries in 1988 along, to children under 5 years of age primarily due to children falling from shopping carts. Approximately one third of these head injuries were concussions, fractures or internal injuries. (See Consumer Product Safety Alert from the U.S. Consumer Product Safety Commission, March 1990, which is hereby incorporated by reference.) In 1992, the U.S. Consumer Product Safety Commission estimates that 22,920 children were treated in hospital emergency rooms for injuries related to shopping carts.

While old style shopping carts were constructed of metal, newer carts are utilizing more plastic parts, including plastic basket portions. Consequently, the center of gravity of newer shopping carts is much lower than the old style metal carts. Since the child seat is generally on the upper portion of the rear panel of the basket portion, a larger child will significantly alter the center of gravity of the cart, especially when the cart is empty. The reported accidents also include injuries resulting from children tipping over the cart by rocking back and forth.

There are presently millions of conventional shopping and luggage carts in use. A shopping cart costs anywhere from $70.00 to $120.00. An economically viable solution to child injuries needs to utilize the existing inventory of carts, without significantly reducing the overall functionality of the carts. For example, the solution can not dramatically change the dimensions of the cart. One approach is to provide a safety strap to retain the child in the cart seat. However, this approach does not address larger children who do not fit properly into the cart seat or parents that have more than one small child.

U.S. Pat. No. 3,575,250 issued to Dykes and U.S. Pat. No. 4,771,840 issued to Keller disclose motorized attachments for shopping carts. However, the motorized units are intended for disabled individuals, not children. Additionally, the motorized units would be cost prohibitive for a broad base solution to the wide spread problem of child injuries relating to shopping carts. Additionally, both of the above patents disclose an articulated or pivotal joint between the carrier and the shopping cart which requires the passenger to steer the cart, a design totally impractical for a child passenger.

U.S. Pat. No. 3,044,801 issued to Vicany discloses an occupant propelled shopping cart. However, the occupant portion is integrally formed with the cart and does not present a viable option for use with the millions of shopping carts in existence.

Therefore, a child carrier accessory is needed for use with existing shopping and airport luggage carts that will allow more than one child, or larger children, to be carried safely without reducing the overall functionality of the cart.

SUMMARY OF THE INVENTION

The present invention relates to a child carrier accessory attachable to a conventional shopping or luggage cart which does not significantly reduce the overall functionality of the cart.

The child carrier includes a platform supported by at least one swivel caster wheel, a seat area and a restraining device for holding the child to the seat. The carrier is rigidly attached to the rear portion of a cart so that the combined structure of the cart and the child carrier pivot as a single structure on the rear wheels of the cart. The preferred child carrier is constructed using a rotational molding process.

Attaching the child carrier accessory to a cart shifts the center of gravity of the cart downward and toward the rear of the cart. Additionally, the seat area on the child carrier is preferably closer the ground than the child seat provided on these carts. Consequently, when a child is riding on the child carrier, the combined unit has a lower center of gravity than when a child is riding in the seat on a cart.

In an alternate embodiment, the child carrier accessory may be attached to the rear of a cart in a cantilever fashion without the use of a swivel caster wheel to support the platform. This embodiment requires sufficient counterweight to insure stability of the cart.

Conventional shopping or luggage carts generally include only a single child seat near the handle. This seat is only suitable for smaller children under approximately 30 pounds or 54 inches in heights. Consequently, parents with more than one child are tempted to allow the older child to ride in the basket portion of the cart or on the luggage rack.

The present invention provides for carrying three children safely in the combined cart and child carrier accessory, while providing enhanced performance of the cart itself. The claimed child carrier accessory has the additional advantage of separating the child from the merchandise or luggage in the cart and providing additional carrying capacity.

The child carrier includes a handle for maneuvering the combination shopping or luggage cart and child carrier. Since the handle on the child carrier extends behind the cart, the operator has additional leverage for maneuvering the combination cart and child carrier. When the cart is weighed down with merchandise or luggage, it is more easily maneuvered from the child carrier handle then from the handle on the cart.

A center divider may be included in the seat area to provide separate seats for two children. Side supports are preferably located on either side of the seat area to provide additional lateral support for restraining the child in the carrier.

A universal mounting bracket is provided with a variety of slotted mounted holes which allow the child carrier to be attached to any standard shopping or airport luggage cart. The mounting bracket preferably includes a reversible connector member bracket for connecting the child carrier to the cart. The reversible connector member bracket may be turned upside down to compensate for variation in the height of the cart frame relative the ground.

BRIEF DESCRIPTION OF THE DRAWINGS

FIG. 8 is perspective view of the preferred child carrier accessory attached to an exemplary luggage cart as viewed from the front of the child carrier.

DETAILED DESCRIPTION OF THE PREFERRED EMBODIMENT

Figure 1:
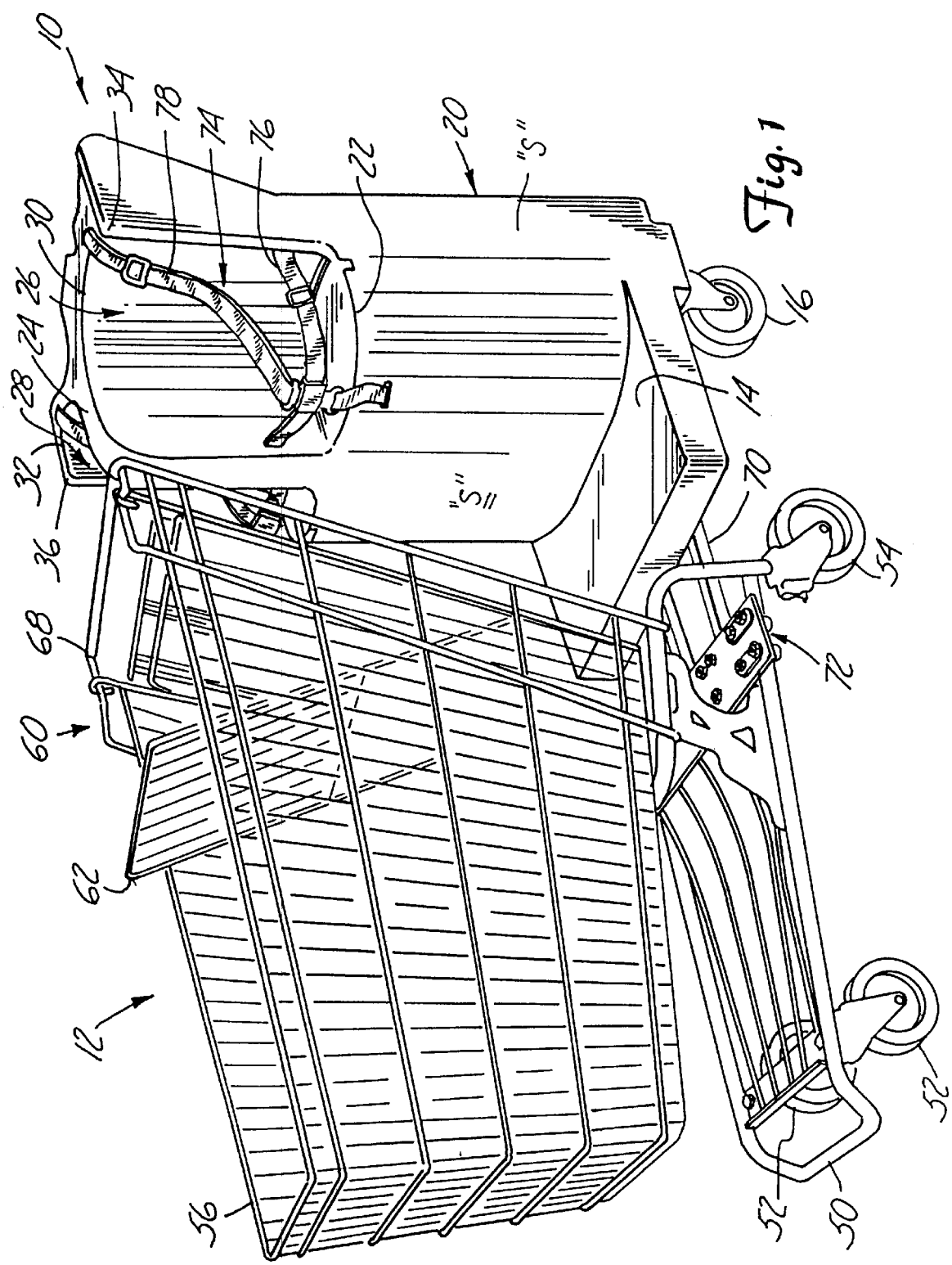
FIG. 1 is perspective view of the preferred child carrier accessory attached to an exemplary shopping cart as viewed from the front of the child carrier.
Figure 2:
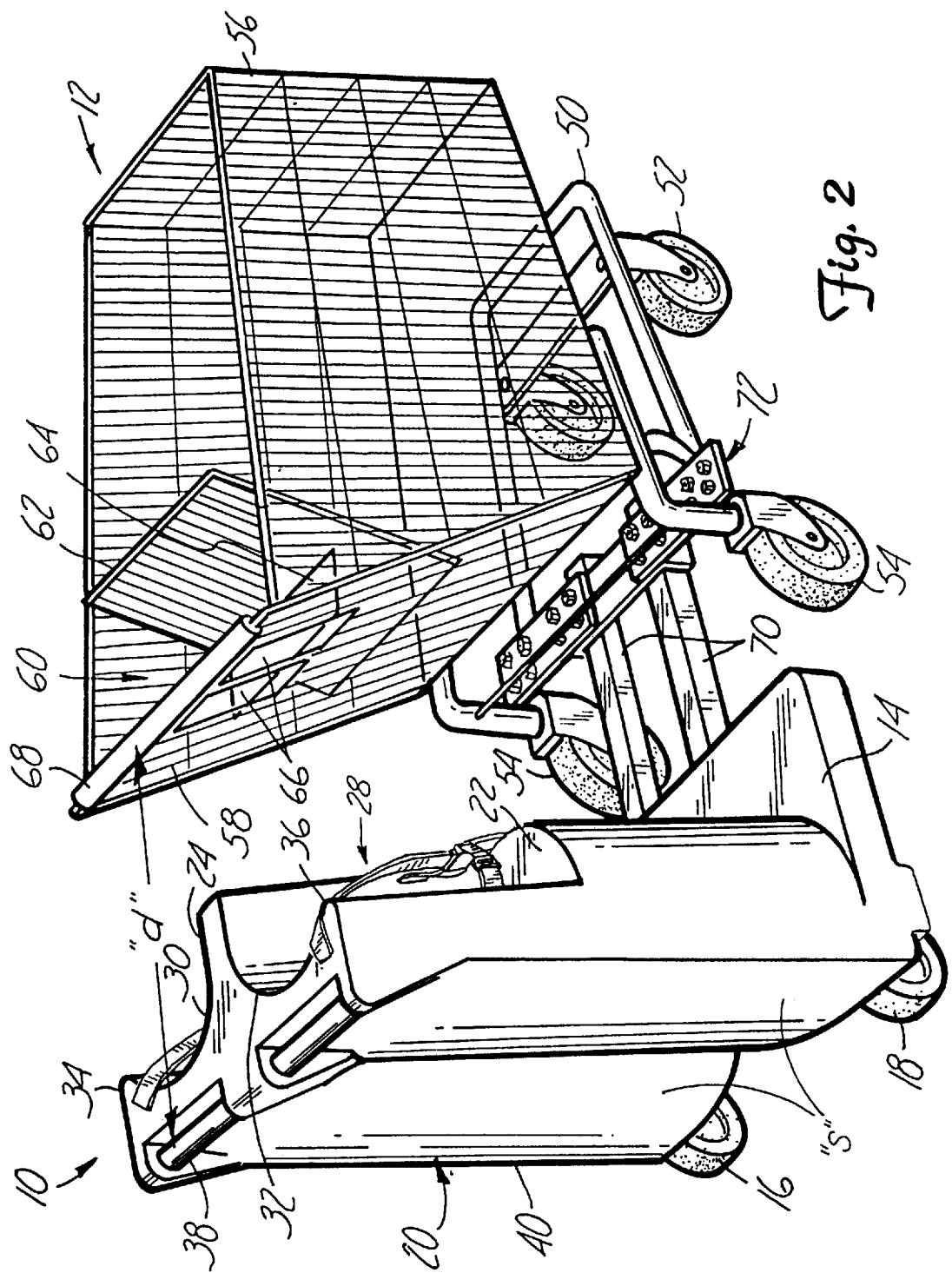
FIG. 2 is as perspective view of the preferred child carrier accessory attached to an exemplary shopping cart as viewed from the rear of the child carrier.
Figure 3:
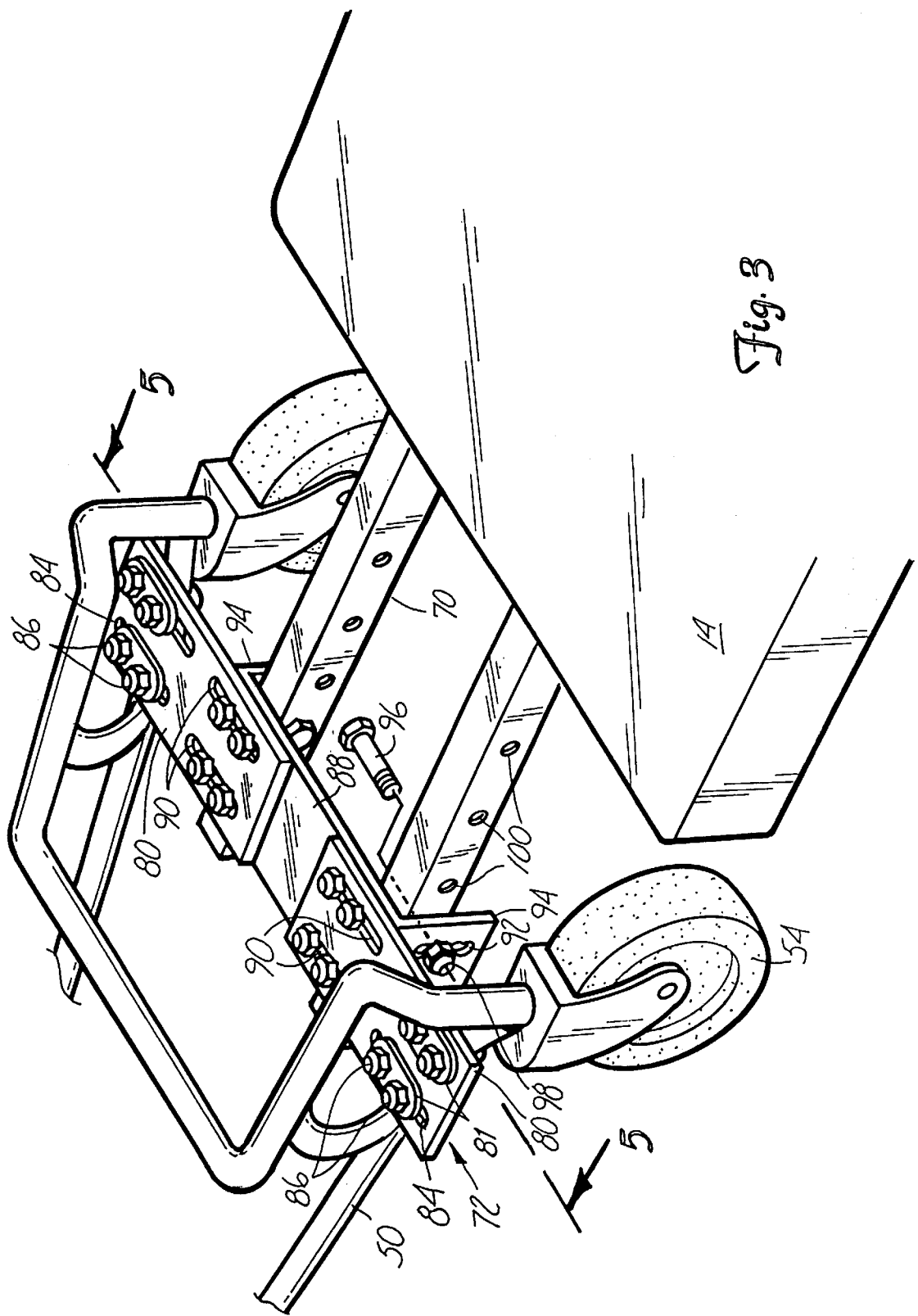
FIG. 3 is a perspective view of the preferred mounting bracket for connecting the child carrier accessory to a shopping cart.

FIGS. 1 and 2 are a perspective view of the preferred child carrier accessory 10 attached to an exemplary shopping cart 12. The child carrier accessory 10 has a platform 14 preferably supported by a pair of preferably swivel caster wheels 16, 18 (See FIG. 2), although it will be understood that other wheel structures are possible. A carrier body 20 located on the platform 14 contains a seat portion 22 with a center divider 24 to form left and right seat areas 26,28, respectively. (See also FIGS. 6 and 7). Curved back supports 30,32 having side support portions 34,36 are preferably integrally formed in the carrier body 20. A carrier handle 38 is provided on a back side 40 of the carrier body 20 for pushing the combination child carrier accessory 10 and shopping cart 12. The carrier handle 38 is preferably located at a comfortable height for pushing (i.e., approximately 38 inches above the ground).

FIG. 8 is a perspective view of the preferred child carrier accessory 10 attached to an exemplary luggage cart 110 as viewed from the front of the child carrier 10. The cart 110 has a carrying location 112 for carrying luggage (not shown). The cart 110 has a child seat 60' near a cart handle 68' sufficient to carry one child. However, the luggage cart 110 tends to be lightweight so that it is extremely top-heavy if a child is placed in the seat 60' and the cart 110 is not loaded down with luggage.

The carrier 10 is attached to the cart 110 using connector bars 70 and universal mounting bracket 72. The platform 14, mounting system 70, 72, and swivel caster wheels 16 (18 not shown) are all located below the child seat 60'. Since these components constitute a fair portion of the weight of the carrier 10, the combined carrier 10 and cart 110 has a lower center of gravity than the cart 110 alone.

The center divider 24 and curved back supports 30 allow for two additional children to be carried in the child care accessory 10 using restraining mechanism 74. It will be understood that the remainder of the discussion is equally applicable to either a shopping cart or a luggage cart and that the present invention is not limited by the specific design of the shopping or luggage carts 12, 110.

In an alternate embodiment, the child care accessory 10 may be attached to a cart in a cantilever fashion, without being supported by wheels. However, it will be understood that this embodiment requires a cart that can adequately counterbalance the weight of the carrier 10 and a child. Alternatively, a counter weight may be attached to the front portion of the cart.

In the preferred embodiment, the child carrier accessory 10 is constructed using a rotational molding process. It will be understood that the child carrier may also be constructed by blow molding, thermal forming, vacuum forming or injection molding. The one-piece plastic child carrier of the preferred embodiment has been tested to hold dynamic weight to 650 lbs. Additionally, the preferred plastic construction is light weight (less than 40 lbs.) and cost effective to manufacture. However, it will be understood by those skilled in the art that a variety of manufacturing techniques are available for achieving the same result. In particular, the child carrier accessory may comprise a number of discrete parts which are assembled. Additionally, the child carrier accessory 10 may be made from a variety of materials including metal, wood, composites, and plastics. The carrier body 20 has a variety of surfaces, such as surfaces "S", suitable for displaying advertising material.

The shopping cart 12 generally comprises a base frame 50 supported by a pair of front swivel caster wheels 52 and a pair of rear caster wheels 54. A carrying location defined by a basket portion 56 generally sits on top of the base frame 50. The basket portion 56 may be either metal or plastic.

The basket portion 56 generally has a rear panel 58 which includes a child seat 60. In conventional shopping carts, the rear panel 58 includes a folding back support 62 hinged to the rear panel 58 and a fold down seat portion 64. The rear panel 58 also includes a pair of leg openings 66 which allow the child to sit facing the rear of the cart 12 proximate a cart handle 68.

The seat portion 22 of the child carrier accessory 10 preferably has a restraining mechanism 74 for securing each child to the child carrier accessory 10. The preferred restraining mechanism 74 includes a waist strap 76 and a shoulder strap 78. Although not recommended by the manufacturer, the child can alternatively stand on the platform 14 while riding in the child carrier 10. A child standing on the platform can grip the cart handle 68 in front and is supported by the carrier body 20 from the rear. Because the platform 14 is relatively low to the ground, the child can get off and on the child carrier accessory 10 with minimal risk of injury. While not the ideal arrangement, experienced parents will recognize the advantage of this arrangement over attempting to restrain a child against his or her will.

When the carts 12, 110 are empty, placing a child in the child seat 60, 60' significantly raises the center of gravity of the carts 12, 110. Since it is not uncommon for parents to place a child weighing 30 pounds or more in the child seat 60, 60', the risk of tipping over the cart 12, 100 is substantial. The seat portion 22 of the child carrier accessory 10 is preferably closer to the ground than the child seat 60, 60' in the carts 12, 110. Consequently, the combination child carrier accessory 10 and cart 12, 110 has a lower center of gravity than the carts along.

When the carts 12, 100 is full of merchandise or luggage, they are difficult to maneuver because of the limited leverage provided by the cart handle 68, 68'. In particular, a loaded down cart has a high moment of inertia which is difficult to overcome from the cart handles 68, 68'.

The combination child carrier accessory 10 and cart 12, 110 has a center of gravity close to the rear wheels of the carts 12, 110. The combined unit tends to pivot on the rear wheels, making it easy to maneuver even in close quarters. Also, since the carrier handle 38 on the child carrier accessory 10 is located behind the cart handle 68, 68' by a distance "d", the user has greater leverage for maneuvering the combination cart 12, 110 and child carrier accessory 10. The distance "d" is approximately 20 inches in the preferred embodiment.

The child carrier accessory 10 is preferably attached to the rear of the base frame 50 by a pair of connector bars 70. Utilizing two connector bars 70 provides lateral support for maneuvering the combined unit. However, it will be understood by those skilled in the art that a variety of connector members are suitable for this purpose. For example, the connection may be made by a single bar or a plate member. A universal mounting bracket 72, as will be discussed below, allows the child carrier accessory 10 to be attached to any size shopping or luggage cart.

FIGS. 3–7 illustrate the universal mounting bracket 72 engaged with the connector bars 70 of the child carrier accessory 10. A pair of upper mounting plates 80 are attached to the base frame 50 of the shopping cart 12 by a U-shaped clamp 82 (See FIG. 5) through slotted mounting plate holes 84 (See FIG. 4) using nuts 86. Washer plates 81 may optionally be included between the nuts 86 and the upper mounting plates 80. The slotted mounting plate holes 84 permit the U-shaped clamp 82 to be adjusted lateral to compensate for differences in the various base frames 50 in use. While the preferred embodiment illustrates a pair of upper mounting plates 80, it will be understood that an equivalent result may be accomplished with a single plate and a variety of other means.

Figure 5:
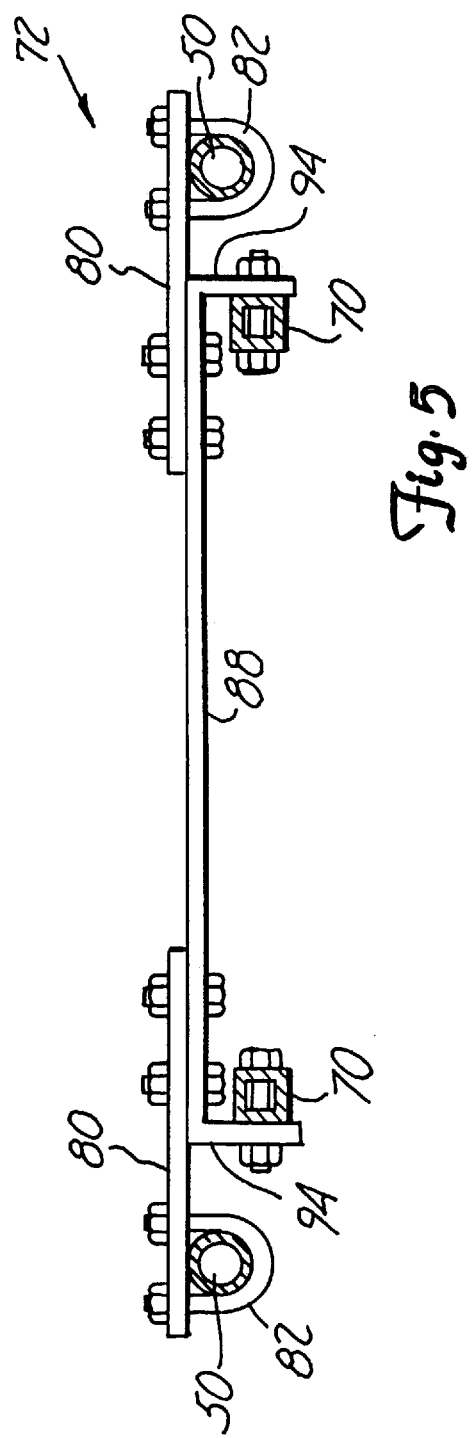
FIG. 5 is an end view of the preferred mounting bracket for connecting the child carrier accessory to a cart.
Figure 6:
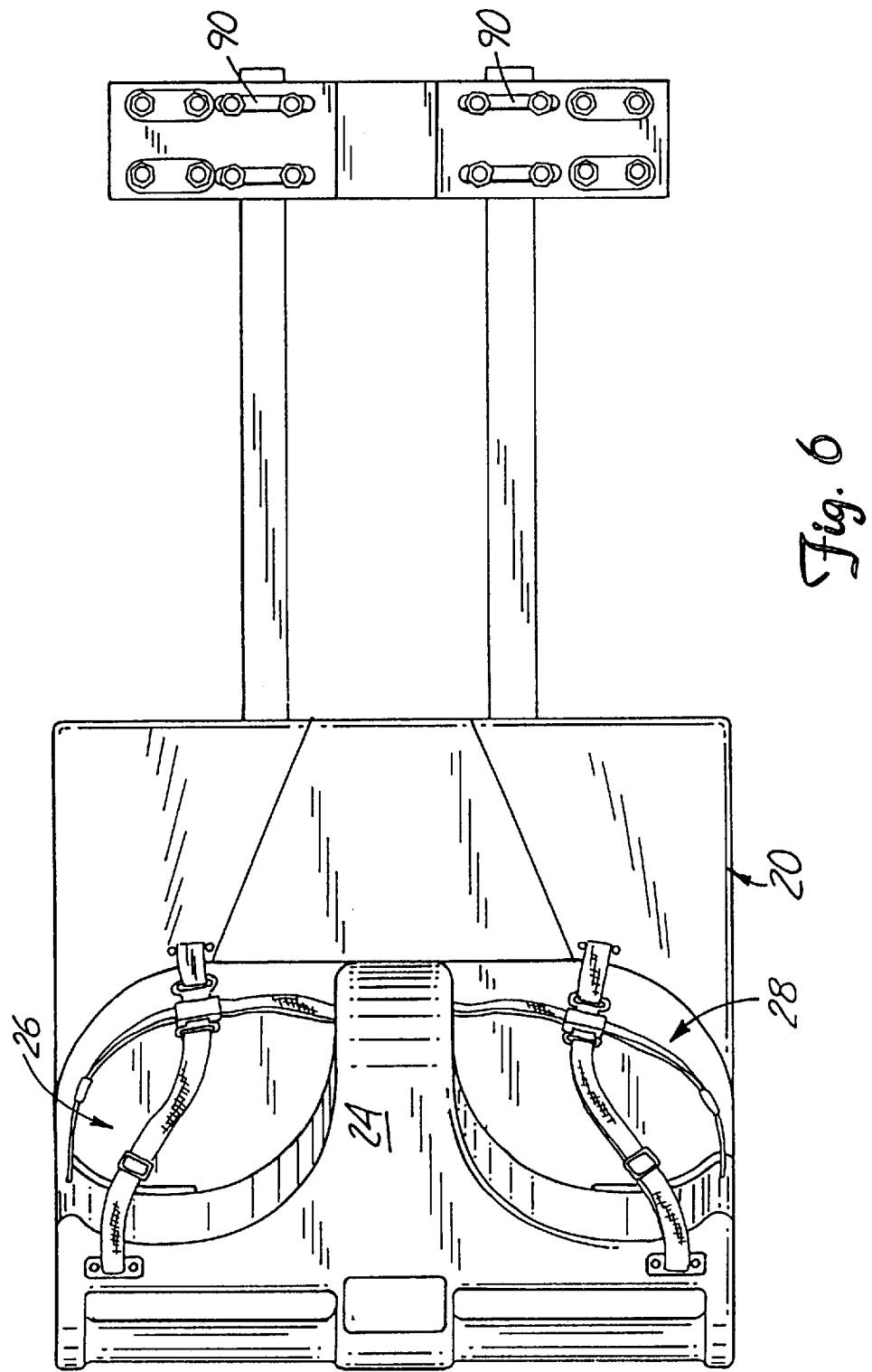
FIG. 6 is a top plan view of the child carrier accessory.

A U-shaped connector bar bracket 88 is attached to the upper mounting plates 80 at a plurality of connector bar bracket slots 90 (See also FIGS. 5 and 6). The connector bar bracket slots 90 similarly permit lateral adjustment of the location of the connector bar bracket 88 relative to the base frame 50. The connector bar bracket 88 is preferably symmetrical so that it can be turned upside down and attached to the tops of the upper mounting plates 80. In doing so, the universal mounting bracket 72 can accommodate shopping carts with a base frame that is low to the ground, while maintaining the connector bars 70 in a horizontal configuration.

The connector bars 70 are attached to height adjustment slot 92 on side portions 94 of the connector bar bracket 88 by bolts 96 and nuts 98. (See FIG. 5). The height adjustment slots 92 also contribute to allowing the connector bars 70 to be maintained in a horizontal position when connected to a variety of shopping carts with base frames of different heights. Alternatively, the connector bar bracket 88 may be inverted 180 degrees and attached to the tops of the upper mounting plates 80 so that the height adjustment slots 92 are above the upper mounting plates 80. This alternate configuration allows for attaching the connector bars 70 horizontally to the base frame 50 of a shopping cart that rides low to the ground. The connector bars 70 preferably have a plurality of positioning holes 100 which permit adjustment of the distance between the platform 14 of the child carrier accessory 10 and the rear of the shopping cart 12. In the preferred embodiment, the child carrier accessory 10 adds only 20 inches to the overall length of the shopping cart 12.

The various mounting slots 84, 90, 92 on the universal mounting bracket 72 and positioning holes 100 on the connector bars 70 allow for significant variations in the height and other dimensions of the base frame 50 while attaching the child carrier accessory 10 in the optimum configuration. It will be understood by those skilled in the art that a variety of mounting brackets are possible for attaching the child carrier accessory to a shopping cart. The configuration illustrated in FIGS. 3–7 is set forth by way of example only and in no way limits the scope of the invention.

Figure 4:
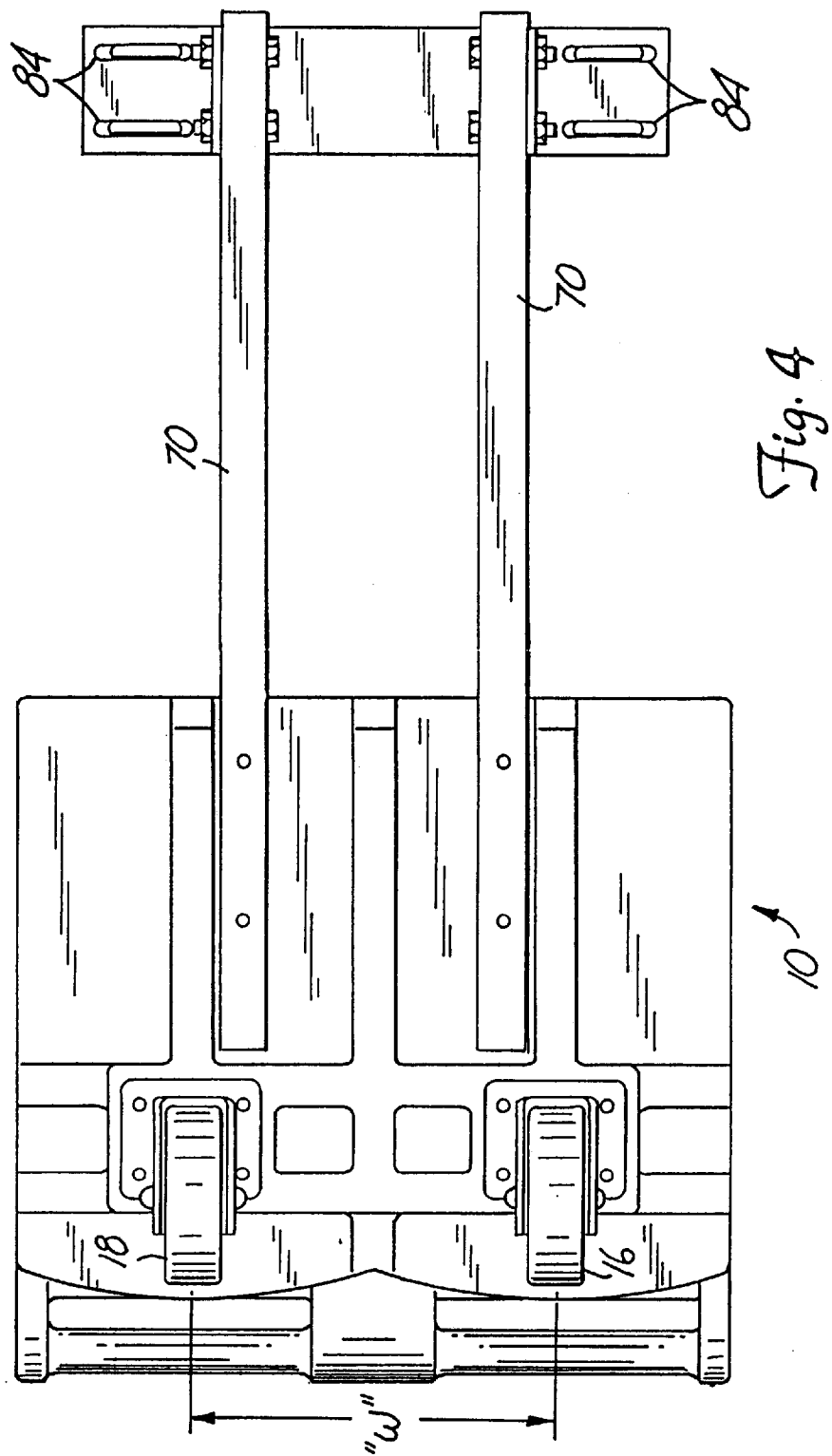
FIG. 4 is bottom plan view of the child carrier accessory.

FIG. 4 is bottom plan view of the child carrier accessory 10 illustrating the location of the swivel caster wheels 16, 18 relative to the connector bars 70. In the preferred embodiment, the distance "w" between the wheels 16, 18 is slightly less than the distance between the rear wheels 54 of the shopping cart 12. This spacing enhances the pivoting of the combined unit 10, 12 on the rear wheels 54. However, it will be understood that in some circumstances, the distance "w" between the wheels 16, 18 may be greater than the distance between the wheels 54 on the shopping cart 12.

FIG. 5 is an end view of the universal mounting bracket 72 for connecting the child carrier accessory 10 to a shopping cart 12. While the clamp 82 for engaging the base frame 50 is generally U-shaped, it will be understood that it can be any shape necessary to engage with the base frame 50 of the shopping cart 12. Likewise, while the connector bars 70 are square, it will be understood that they can be for example, round, rectangular or any other suitable shape.

Figure 7:
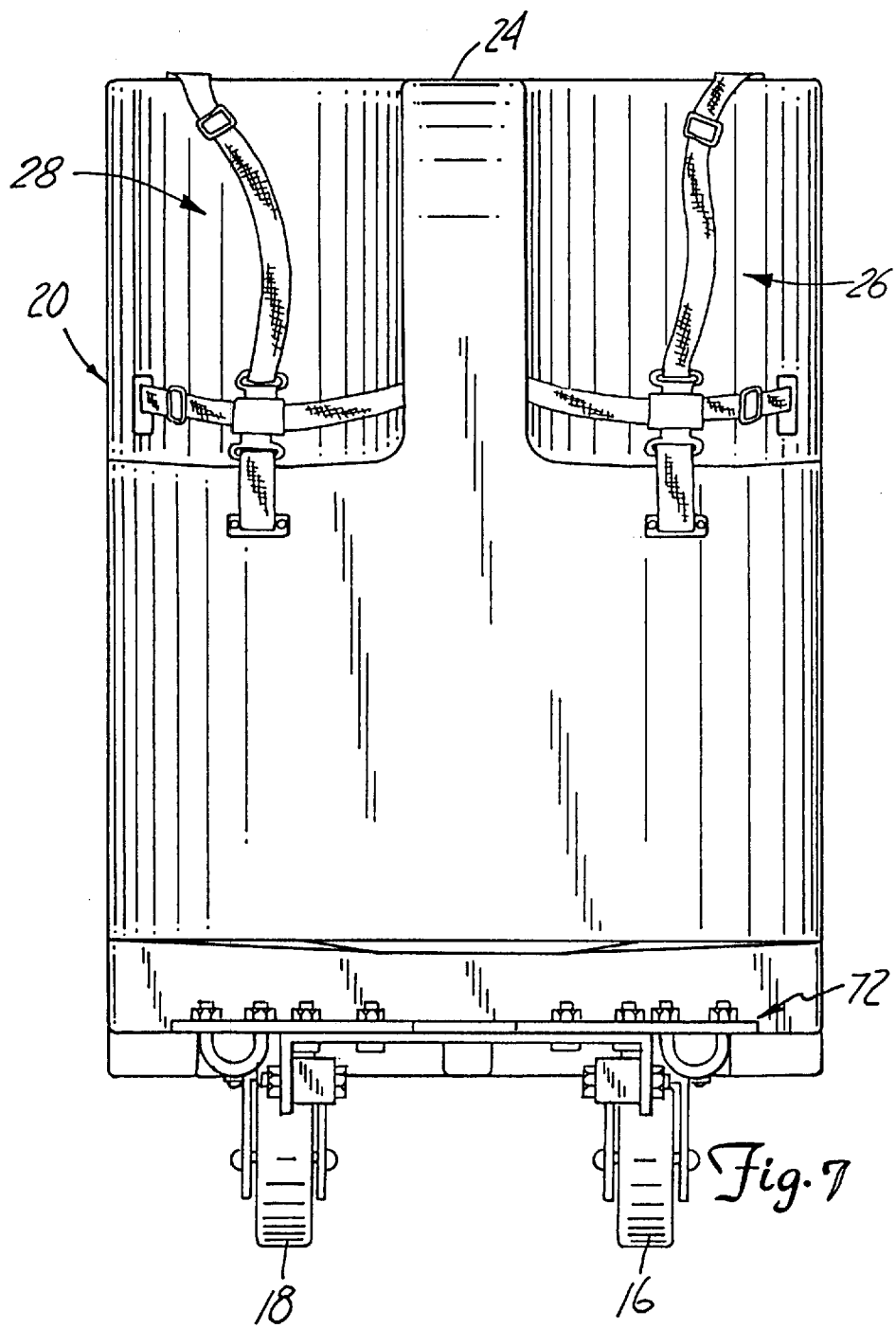
FIG. 7 is a front elevation of the child carrier accessory.

FIGS. 6 and 7 illustrate a top and front plan view, respectively, of the child carrier accessory 10. While FIGS. 6 and 7 illustrates the carrier body 20 having a center divider 24, it will be understood that the center divider 24 may be removed without departing from the scope of the present invention.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. A child carrier accessory attached to a cart, the cart having a base frame supported by at least one rear wheel, the base frame supporting a carrying location thereon, the child carrier accessory comprising;

a platform supported by at least one platform wheel;

a carrier body located on the platform having at least one seat area;

a carrier handle attached to the carrier body for pushing the child carrier accessory; and connector means rigidly connectable to the child carrier accessory and the cart so that the cart and the child carrier accessory are steered by the carrier handle, pivoting on an axis of the at least one rear wheel, the connector means maintaining the child carrier accessory a fixed distance from the cart when rigidly connected thereto, the fixed distance defining a space therebetween that permits a child to get off and on the child carrier accessory.

2. A combination of a child carrier accessory and a cart, comprising:

a cart having a base frame supported by at least one front and at least one rear wheel, the base frame supporting a carrying location thereon; and a child carrier accessory comprising;
   a carrier body having at least one seat area supported by a platform portion, the carrier body being supported by at least one platform wheel;
   carrier handle means on the carrier body for pushing the combined child carrier and cart; and
   connector means for rigidly attaching the child carrier accessory to the cart so that the combined structure of the cart and the child carrier accessory are steered by the carrier handle means, pivoting on an axis of the at least one rear wheel, the connector means maintaining the child carrier accessory a fixed distance from the cart, the fixed distance defining a space therebetween that permits a child to get on and off the child carrier accessory.

3. The apparatus of claims 1 or 2 wherein the at least one platform wheel comprises a swivel caster wheel.

4. The apparatus of claims 1 or 2 wherein the at least one seat area includes lateral side supports.

5. The apparatus of claims 1 or 2 wherein the at least one seat area includes a center divider so that the at least one seat area is divided into two separate seats.

6. The apparatus of claims 1 or 2 wherein the carrying location having a basket with a child seat located generally above the at least one rear wheel, the child seat having a seat panel, the at least one seat area of the child carrier accessory comprising a location closer to the ground than the seat panel of the child seat on the basket.

7. The apparatus of claims 1 or 2 wherein the combination of the child carrier accessory attached to the cart has a lower center of gravity than the cart alone.

8. The apparatus of claims 1 or 2 wherein the connector means are rigidly attachable to the base frame of the cart by a mounting bracket, the mounting bracket having slotted mounting holes for adjusting the position of the mounting bracket relative to the base frame of the cart.

9. The apparatus of claims 1 or 2 wherein the connector means are rigidly attachable to the base frame of the cart by mounting bracket means.

10. The apparatus of claims 1 or 2 wherein the connector means are rigidly attachable to the base frame of the cart by mounting bracket means, the mounting bracket means having at least one reversible portion connected to base frame mounting plates, which reversible portion is connected thereto in a reverse configuration for selectively varying the height at which the at least one connector means connects to the mounting bracket means.

11. The apparatus of claims 1 or 2 wherein the carrier body is plastic.

12. The apparatus of claims 1 or 2 wherein the platform and carrier body are constructed as a unitary molded plastic structure.

13. The apparatus of claims 1 or 2 further including restraining means for restraining a child passenger to the seat area on the carrier body.

14. The apparatus of claims 1 or 2 wherein the cart comprises a shopping cart.

15. The apparatus of claims 1 or 2 wherein the cart comprises a luggage cart.

16. The apparatus of claims 1 or 2 wherein the carrier body has a surface for displaying advertising material.

17. The child carrier accessory of claims 1 or 2 wherein at least a portion of the platform extends forward of the carrier body.

18. The apparatus of claim 5 wherein the two separate seats further comprise side supports.

19. The apparatus of claim 10 wherein the at least one reversible portion includes slotted mounting holes for adjustable interconnection with the at least one connector means.

20. A child carrier accessory attached to a cart, the cart having a base frame supported by at least one rear wheel, the base frame supporting a carrying location thereon, the child carrier accessory comprising;

a platform supported by at least one platform wheel located at approximately the level of the base frame;

a carrier body located on the platform having at least one seat area, a portion of the platform extending forward of the carrier body to assist a child in getting and on the child carrier accessory;

a carrier handle attached to the carrier body for pushing the child carrier accessory; and connector means rigidly connectable to the child carrier accessory and the cart so that the cart and the child carrier accessory are steered by the carrier handle, pivoting on an axis of the least one rear wheel, the connector means maintaining the child carrier accessory a fixed distance from the cart when rigidly connected thereto, the fixed distance defining a space therebetween.

* * * * *